United States Patent
Huffman et al.

(10) Patent No.: US 10,372,260 B2
(45) Date of Patent: Aug. 6, 2019

(54) APPARATUS AND METHOD OF ADJUSTING POWER MODE OF A DISPLAY OF A DEVICE

(71) Applicant: Microsoft Technology Licensing, LLC, Redmond, WA (US)

(72) Inventors: Katherine B. Huffman, Seattle, WA (US); Kyle T. Beck, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 15/375,991

(22) Filed: Dec. 12, 2016

(65) Prior Publication Data
US 2018/0164942 A1  Jun. 14, 2018

(51) Int. Cl.
*G06F 1/3206*  (2019.01)
*G06F 1/3231*  (2019.01)
(Continued)

(52) U.S. Cl.
CPC .......... *G06F 3/0416* (2013.01); *G06F 1/3203* (2013.01); *G06F 1/3206* (2013.01);
(Continued)

(58) Field of Classification Search
CPC .... G06F 3/0416; G06F 1/3265; G06F 1/3206; G06F 1/3203; G06F 1/3231; G09G 5/003; G09G 2230/021; G09G 2330/022
See application file for complete search history.

(56) References Cited

U.S. PATENT DOCUMENTS 7,289,102 B2  10/2007  Hinckley et al.
7,508,316 B1 *  3/2009  Arrar ................. A47G 27/0237
                                                340/502
(Continued)

FOREIGN PATENT DOCUMENTS

GB          2522755 A  *  8/2015  ........... G06F 3/0414

OTHER PUBLICATIONS

Gupta et al. "SoundWave: Using the Doppler Effect to Sense Gestures". CHI 2012, May 5-10, 2012, pp. 1911-1914. (Year: 2012).*

(Continued)

*Primary Examiner* — Julie Anne Watko
(74) *Attorney, Agent, or Firm* — Arent Fox LLP (57) ABSTRACT

Methods and devices for adjusting a power mode of a display are disclosed. An example method includes detecting a set of contact signals on a surface of the device and determining whether the set of contact signals correspond to a contact signature associated with an in-use state of the display. The example method further includes transitioning the power mode of the display to a power saving mode in response to determining that the set of contact signals do not correspond to the contact signature associated with the in-use state of the display, and retaining the power mode of the display in a current power mode in response to determining that the set of contact signals correspond to the contact signature associated with the in-use state of the display. An additional example method may further include detecting whether a proximity sensor at the device is occluded prior to the transition.

20 Claims, 8 Drawing Sheets (51) Int. Cl.
*G06F 3/041* (2006.01)
*G09G 3/20* (2006.01)
*G09G 5/00* (2006.01)
*G06F 1/3203* (2019.01)

(52) U.S. Cl.
CPC ........... *G09G 5/003* (2013.01); *G06F 1/3231* (2013.01); *G09G 2330/021* (2013.01); *G09G 2330/022* (2013.01)

(56) References Cited

U.S. PATENT DOCUMENTS

| | | | |
|---|---|---|---|
| 8,994,499 B2 | 3/2015 | Zhao et al. | |
| 9,880,655 B2* | 1/2018 | O'Connor | G06F 3/0416 |
| 10,007,382 B2* | 6/2018 | Iida | G06F 3/0488 |
| 2002/0021278 A1* | 2/2002 | Hinckley | G06F 1/1626 |
| | | | 345/156 |
| 2008/0168403 A1* | 7/2008 | Westerman | G06F 3/04883 |
| | | | 715/863 |
| 2010/0134423 A1* | 6/2010 | Brisebois | G06F 3/03547 |
| | | | 345/173 |
| 2012/0032891 A1* | 2/2012 | Parivar | G06F 3/04883 |
| | | | 345/173 |
| 2012/0038609 A1* | 2/2012 | Chung | G09G 3/003 |
| | | | 345/211 |
| 2012/0127124 A1 | 5/2012 | Zanone et al. | |
| 2013/0285975 A1* | 10/2013 | Hong | G06F 3/044 |
| | | | 345/174 |
| 2013/0300668 A1 | 11/2013 | Churikov et al. | |
| 2013/0335319 A1 | 12/2013 | Balasundaram et al. | |
| 2014/0028577 A1* | 1/2014 | Krah | G06F 3/0416 |
| | | | 345/173 |
| 2014/0125612 A1* | 5/2014 | Park | G06F 3/0416 |
| | | | 345/173 |
| 2014/0204035 A1* | 7/2014 | Chang | G06F 3/0416 |
| | | | 345/173 |
| 2014/0253464 A1 | 9/2014 | Hicks et al. | |
| 2015/0153884 A1* | 6/2015 | Li | G06F 3/0488 |
| | | | 345/173 |
| 2015/0161369 A1 | 6/2015 | Weksler et al. | |
| 2015/0205400 A1 | 7/2015 | Hwang et al. | |
| 2015/0338949 A1* | 11/2015 | Westerman | G06F 3/044 |
| | | | 345/174 |
| 2016/0179288 A1* | 6/2016 | Iida | G06F 3/0488 |
| | | | 345/173 |
| 2016/0195986 A1* | 7/2016 | Kwon | G06F 3/044 |
| | | | 345/174 |
| 2016/0202781 A1* | 7/2016 | Kim | G06F 1/1652 |
| | | | 345/173 |
| 2017/0115693 A1* | 4/2017 | Li | G06F 1/1626 |
| 2018/0101263 A1* | 4/2018 | Takashima | G06F 3/044 |
| 2018/0129262 A1* | 5/2018 | Veiga | G06F 1/162 |
| 2018/0164942 A1* | 6/2018 | Huffman | G06F 1/3203 |

OTHER PUBLICATIONS

Murao et al. "Mobile phone user authentication with grip gestures using pressure sensors". International Journal of Pervasive Computing and Communications 11.3: 288-301. (Year: 2015).*

Lettner, et al., "Heat Maps as a Usability Tool for Multi-Touch Interaction in Mobile Applications", In Proceedings of the 11th International Conference on Mobile and Ubiquitous Multimedia, Dec. 4, 2012, 2 pages.

"Touch Heatmaps", https://www.appsee.com/features/touch-heatmaps, Published on: Dec. 31, 2013, 4 pages.

Yang, et al., "Surround-See: Enabling Peripheral Vision on Smartphones during Active Use", In Proceedings of the 26th annual ACM symposium on User interface software and technology, Oct. 8, 2013, pp. 1-10.

Butler, et al., "SideSight: Multi-"touch" interaction around small devices", In Proceedings of the 21st annual ACM symposium on User interface software and technology, Oct. 19, 2008, 4 pages.

Noopuran, et al., "Exclusive: Proximity Sensing in Mobile Phones", https://www.wirelessdesignmag.com/article/2014/01/exclusive-proximity-sensing-mobile-phones, Published on: Jan. 31, 2014, 16 pages.

"International Search Report and Written opinion Issued in PCT Application No. PCT/US2017/064979", dated Feb. 27, 2018, 11 Pages.

* cited by examiner

APPARATUS AND METHOD OF ADJUSTING POWER MODE OF A DISPLAY OF A DEVICE

BACKGROUND

The present disclosure relates to saving power of a device, and more particularly, to adjusting a power mode of a display of the device.

A display of a device consumes a significant share of battery power available of the device. For example, for a computer device, some reports estimate that a display may utilize about of 80% of the battery power available at the device. Current solutions that attempt to change operation of the display to save power can work in some instances, however, such solutions also include certain drawbacks. For instance, some current solutions attempt to utilize a proximity sensor in the vicinity of the display, but these solutions often generate false positives of the proximity sensor being blocked, which causes the display to be turned off prematurely and ruins the user experience.

SUMMARY

The following presents a simplified summary of one or more disclosed features in order to provide a basic understanding of the disclosure. This summary is not an extensive overview of all contemplated implementations, and is intended to neither identify key or critical elements of all implementations nor delineate the scope of any or all implementations of the present disclosure. Its sole purpose is to present some concepts of one or more features of the present disclosure in a simplified form as a prelude to the more detailed description that is presented later.

One implementation relates to a method of detecting a set of contact signals on a surface of the device, determining whether the set of contact signals correspond to a contact signature associated with an in-use state of the display, transitioning the power mode of the display to a power saving mode in response to determining that the set of contact signals do not correspond to the contact signature associated with the in-use state of the display, and retaining the power mode of the display in a current power mode in response to determining that the set of contact signals correspond to the contact signature associated with the in-use state of the display.

In another implementation, an apparatus for adjusting a power mode of a display of a device may include a memory and a processor in communication with the memory, wherein the processor is configured to detect a set of contact signals on a surface of the device, determine whether the set of contact signals correspond to a contact signature associated with an in-use state of the display, transition the power mode of the display to a power saving mode in response to determining that the set of contact signals do not correspond to the contact signature associated with the in-use state of the display, and retain the power mode of the display in a current power mode in response to determining that the set of contact signals correspond to the contact signature associated with the in-use state of the display.

In a further implementation, a computer-readable medium storing computer-executable instructions executable by a processor for adjusting a power mode of a display of a device is disclosed. The computer-readable medium includes instructions for detecting a set of contact signals on a surface of the device, determining whether the set of contact signals correspond to a contact signature associated with an in-use state of the display, transitioning the power mode of the display to a power saving mode in response to determining that the set of contact signals do not correspond to the contact signature associated with the in-use state of the display, and retaining the power mode of the display in a current power mode in response to determining that the set of contact signals correspond to the contact signature associated with the in-use state of the display.

Additional advantages and novel features relating to features of the present disclosure will be set forth in part in the description that follows, and in part will become more apparent to those skilled in the art upon examination of the following or upon learning by practice thereof.

DETAILED DESCRIPTION

The present disclosure provides for a mechanism/procedure/technique and an apparatus for adjusting a power mode of a display of a device. A power mode adjusting component may be configured to determine whether the user of the device is engaged with the display of the device (e.g., also referred to as "in-use state" of the display) based on a grip or a touch signature, also referred to as a contact signature, produced on a surface (e.g., display or sides) of the device. The power mode adjusting component may transition the display of the device to a power saving mode (e.g., low power mode or an idle mode) when the contact signature indicates the user is no longer engaged with the device, or may retain the display of the device at the current power mode when the contact signature indicates that the user is actively engaged with the display of the device. Additionally, the power mode adjusting component may be further configured to check whether a proximity sensor at the device is occluded prior to the transitioning or retaining the power mode of the display of the device, which may improve reliability of the procedure. Thus, implementations of the disclosed power mode adjusting component may improve efficiency in power usage of the display of the device.

Figure 1A:
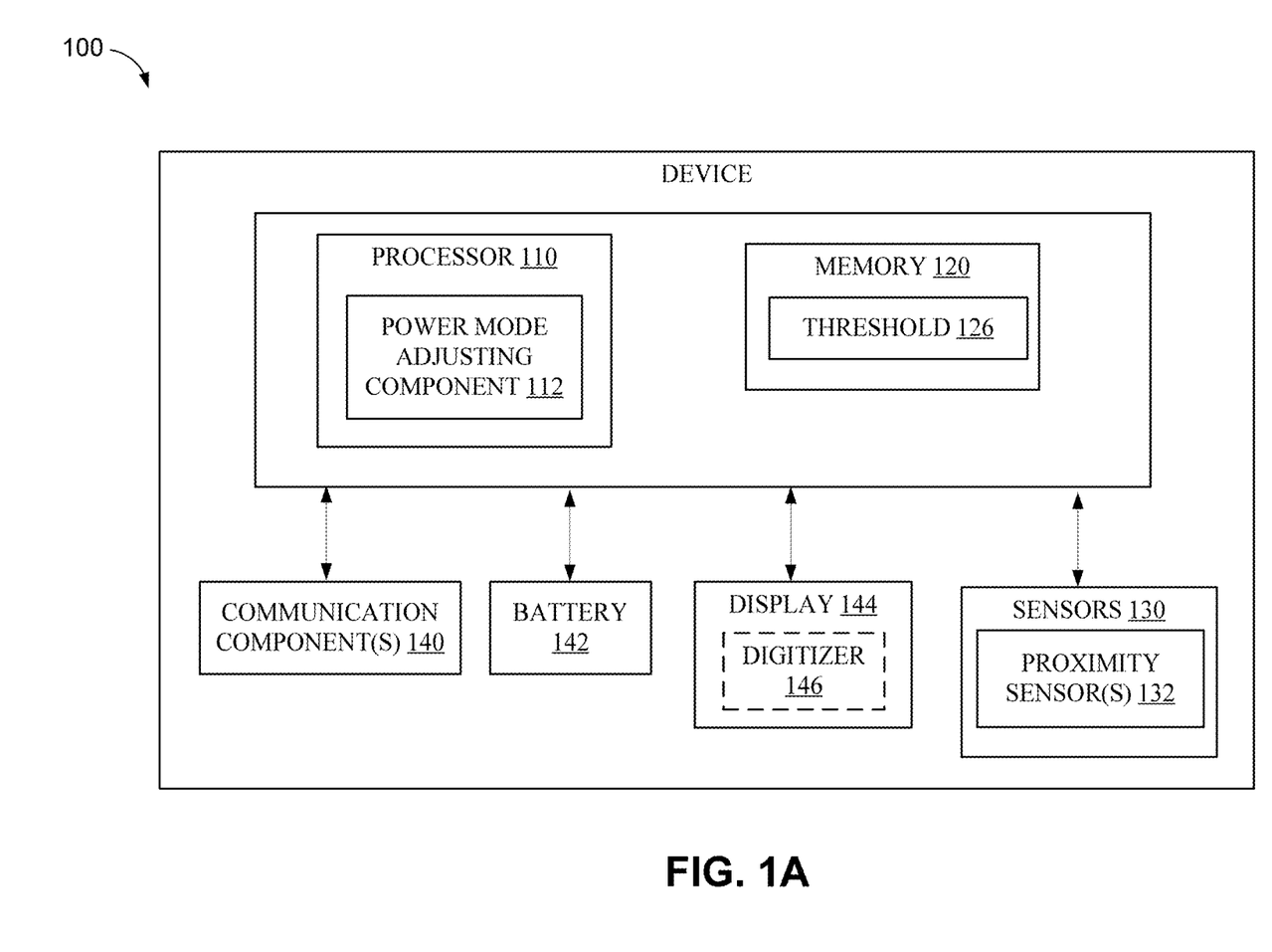
FIGS. 1A and 1B are schematic block diagrams of an example device which may include one or more components and/or subcomponents for adjusting a power mode of a display at device in accordance with various implementations of the present disclosure.

FIG. 1A includes an example device 100 which may have one or more components and/or subcomponents, such as a power mode adjusting component 112, for adjusting a power mode of a display 144 in communication with and/or controlled by device 100 based on contact signatures and/or objects contacting or close to surface of device 100 and being correlated with whether and/or how a user is engaged or interacting with device 100. Although FIG. 1A includes display 144 within device 100, it should be understood that in some cases display 144 may be integrated with device 100, while in other cases display 144 may be separate from device 100. It should also be noted that device 100 may have multiple displays 144 and/or that different users may be using the multiple displays. In some implementations, device 100 may be a personal computer (PC), gaming device, tablet, lap-top computer, personal digital assistant (PDA), mobile phone, mobile station (MS), user equipment (UE), etc. Device 100 may further include or otherwise be communicatively coupled with a processor 110 and/or a memory 120, where the processor 110 and/or the memory 120 may be configured to execute or store instructions or other parameters, such as a threshold 126, for performing the functions described herein.

Additionally, device 100 may include one or more sensors 130, such as but not limited to one or more proximity sensors 132. In one example, proximity sensor 132 may be an infrared (IR) sensor that can detect the presence of nearby objects. For instance, proximity sensor 132 may detect nearby objects based on proximity sensor 132 being occluded (e.g., blocked, obscured, etc.) by a human body part, such as the user's ear, fingers, and/or by other objects (e.g., device set face down on a table, device placed in the user's pockets). In another example, proximity sensor 132 may be located on display 100 where it is positioned relative to display 144 (or any other structure on device 100, e.g., edges of device 100, that may be relevant).

Further, display 144 may be or include a liquid crystal display (LCD), a light emitting diode (LED), an organic LED (OLED), or any other type of output generating device that utilizes energy (e.g., power from a battery or electrical circuit). In an aspect, display 144 may be a touch-sensitive display, which may include a digitizer 146 that may detect touch inputs (e.g., points and/or areas) on display 144, for example, for detecting whether or not the user is engaged or interacting with device 100. In an additional aspect, digitizer may 146 may be separate from display 144. For example, digitizer 146 may be a touch sensor located on the back or edges of device 100 (and/or not connected to display 144 of device 100) and providing information on how device 100 is being touched and/or held.

Furthermore, device 100 may include one or more communication component(s) 140 for communicating with other devices via a wired or wireless interface (e.g., Bluetooth, radio frequency identification (RFID), near field communication (NFC), among other examples). Device 100 may also include a battery 142 for providing power to various components and/or subcomponents of device 100.

Also, device 100 may include an operating system executed by processor 110 and/or memory 120 of device 100. Memory 120 may be configured for storing data and/or computer-executable instructions defining and/or associated with operating system (and/or firmware). An example of memory 120 may include, but is not limited to, a type of memory usable by a computer, such as random access memory (RAM), read only memory (ROM), tapes, magnetic discs, optical discs, volatile memory, non-volatile memory, and any combination thereof. Processor 110 may execute operating system and/or one or more associated components such as power mode adjusting component 112. An example of processor 110 may include, but is not limited to, any processor specially programmed as described herein, including a controller, microcontroller, application specific integrated circuit (ASIC), field programmable gate array (FPGA), system on chip (SoC), or any other programmable logic or state machine.

Additionally, power mode adjusting component 112 may determine whether a user of device 100 is engaged with device 100 based on at least a contact signature associated with the user of device 100. A contact signature may include, but is not limited to, a set of one or more mappings of points or areas of contact of an object, e.g., a user hand or finger(s) or some other inanimate object (e.g., inside of a pocket, table surface), with a point or surface of device 100 and/or display 144. In one implementation, the contact signature may be based on only touch contact (as opposed to both touch and proximity being detected). Further, such contact signatures may be correlated to a user engaged state or a user not engaged state with respect to whether or not the user is interacting with display 144. Further, one or more of sensors 130, such as digitizer 146 and/or proximity sensor 132, may detect objects in contact with or near one or more surfaces of device 100 and provide the corresponding data, which may be transformed into a current contact signature. Power mode adjusting component 112 may transition a power mode of display 144 to a low power mode or an idle mode in response to determining that the user of device 100 is not engaged with device 100. Alternatively, power mode adjusting component 112 may retain the power mode of display 144 in the current power mode in response to determining that the user of device 100 is engaged with device 100.

Additionally, in some implementations, power mode adjusting component 112 may further detect whether one or more proximity sensor(s) 132 at device 100 is occluded prior to transitioning the power mode of display 144 to the low power mode or the idle mode, or retaining the power mode of display 144 in the current power mode.

Figure 1B:
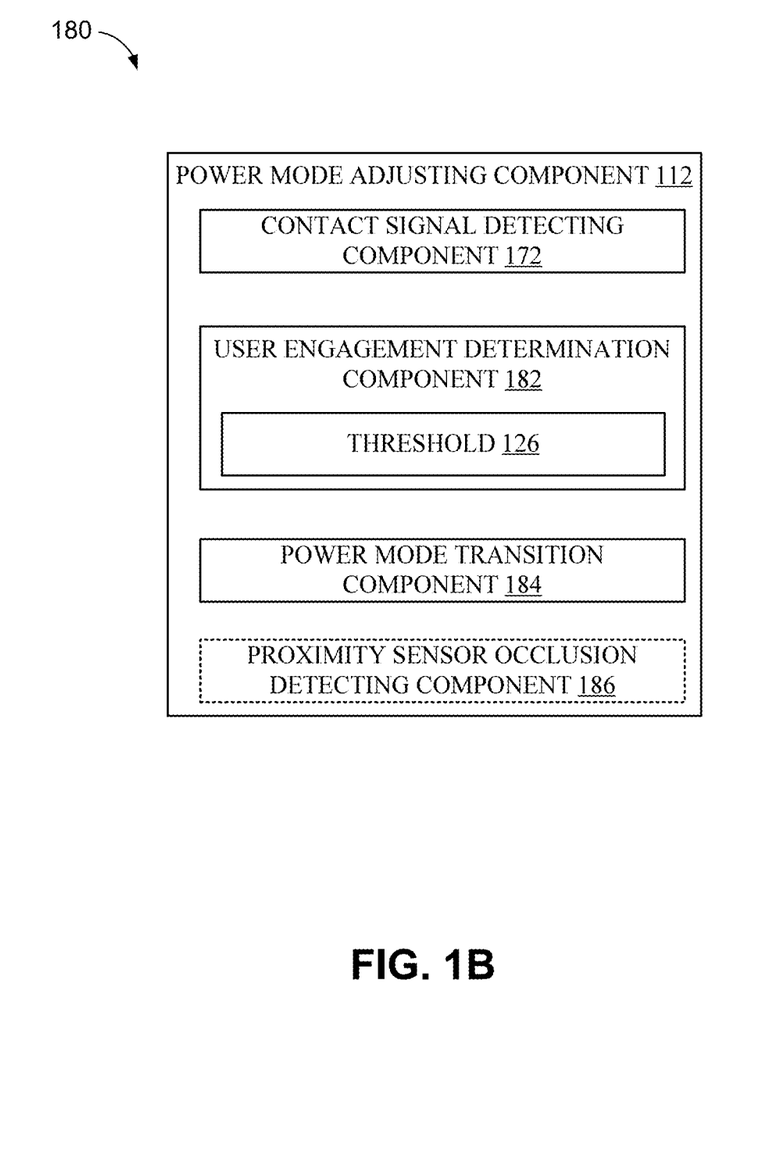

FIG. 1B includes an example of additional sub-components of power mode adjusting component 112 that are configured to operate together for adjusting power mode of display 144 at device 100 in accordance with various implementations of the present disclosure.

For example, power mode adjusting component 112 may include contact signal detecting component 172 (e.g., digitizer 146 or sensors 130) to detect a set of signals on a surface of device 100, a user engagement determination component 182 to determine whether a user of device 100 is engaged with device 100 based on at least a contact signature associated with a hand and/or finger(s) of the user in contact with device 100. Further, such contact signatures may be correlated to a user engaged state or a user not engaged state. For example, contact signatures may represent, but are not limited to, conditions such as the user gripping device 100 around edges of device 100, the user holding device 100 with one or two hands in a landscape orientation, or a contact covering a majority of display 144 of device 100. For instance, user engagement determination component 182 is configured to compare a currently received contact signature with a library of known contact signatures (e.g., each corresponding to a user engaged state or a user not engaged state), to determine whether the user is engaged with device 100. For example, the comparison may include looking at a size of a contact, duration of the contact, movement of the contact, and/or signal strength of the contact, etc.

Further, for example, power mode adjusting component 112 may include power mode transition component 184 to transition the power mode of display 144 to a low power mode or an idle mode, or to retain the power mode of display 144 in the current power mode based at least on the determining whether the user of device 100 is engaged with device 100 and/or the detecting whether proximity sensor 132 is occluded. In one implementation, power mode adjusting component 112 and/or power mode transition component 184 may send a notification to a display controller to either turn off display (e.g., idle mode) with content no longer being rendered or dim a backlight panel (e.g., low power mode) with content still being rendered.

Furthermore, for example, power mode adjusting component 112 may include a proximity sensor occlusion detecting component 186 configured to determine whether proximity sensor 132 at device 100 is occluded based on communication with proximity sensor 132. For instance, proximity sensor occlusion detecting component 186 may query proximity sensor 132 about the status of the proximity sensor 132, or proximity sensor 132 may send notifications every time proximity sensor 132 changes states, for example, from blocked to unblocked or unblocked to blocked. In this case, proximity sensor occlusion detecting component 186 may infer from a blocked state of proximity sensor 132 that a user is not engaged or interacting with display 144, while inferring from an unblocked state of proximity sensor 132 that a user is engaged or interacting with display 144. In one implementation, power mode adjusting component 112 and/or proximity sensor occlusion detecting component 186, via operating system of device 100, may receive a reading from proximity sensor 132 that proximity is detected with a distance to a detected object. If the object is within a configured distance to proximity sensor 132, power mode adjusting component 112 and/or proximity sensor occlusion detecting component 186 may determine that proximity sensor 132 is occluded.

Thus, according to the present disclosure, device 100 operating power mode adjusting component 112 is able to detect the intent of a user of device 100, e.g., with respect to whether a power mode of display 144 should be changed, based on whether the user is engaged with device 100 (e.g., interacting with display 144). If not, then power mode adjusting component 112 may idle or turn off display 144 of device 100 to save power. This power savings mechanism may also be extended to include input from proximity sensor 132, which can provide an additional degree of confidence to a power mode changing decision. In this case, the decision to change the power mode of display 144 may be further based on whether proximity sensor 132 is occluded, e.g., blocked, which may indicate that the user is not engaged with device 100 (e.g., and/or not interacting with display 144).

Figure 2:
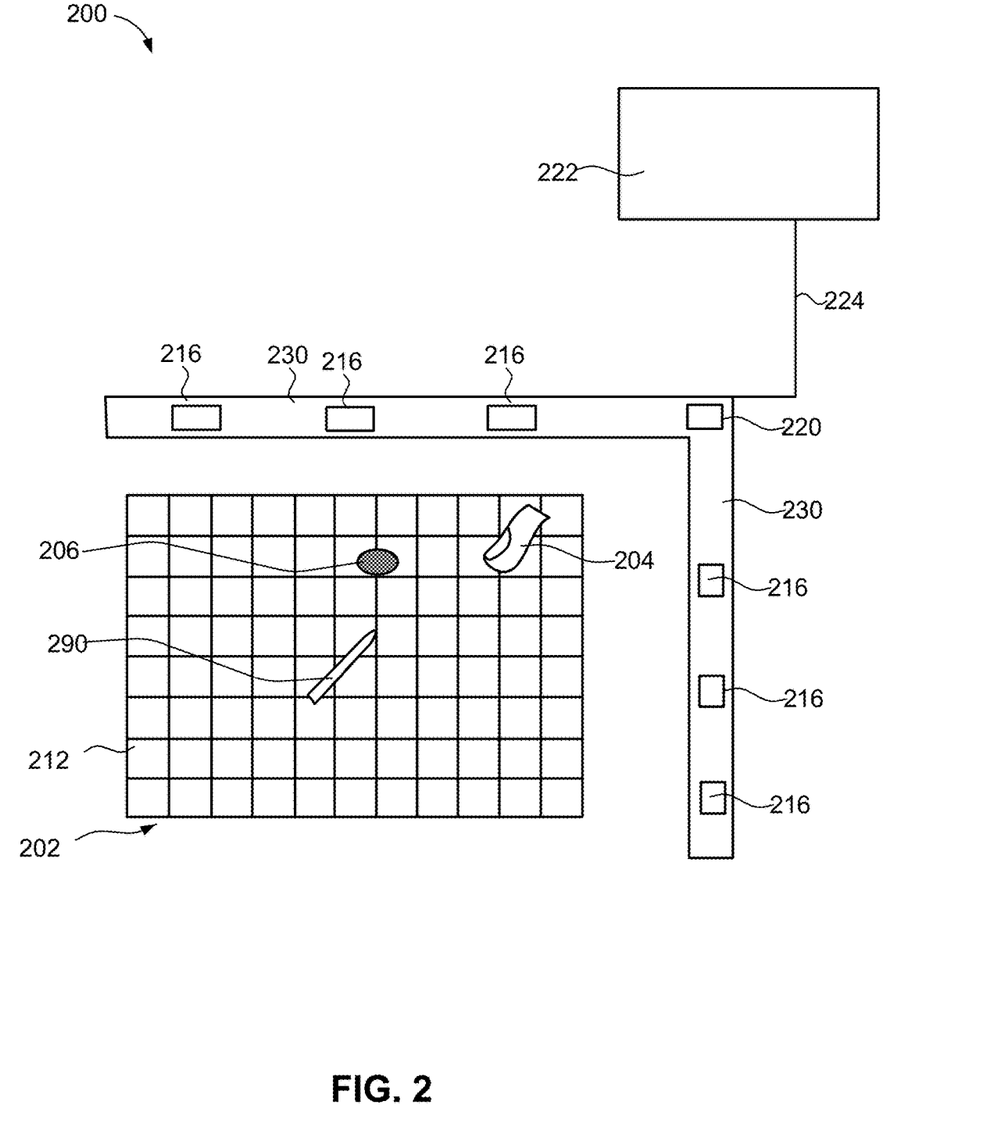
FIG. 2 is a schematic view of an example digitizer system or digitizer for detecting contacts signatures on the surface of the device in accordance with various implementations of the present disclosure.

Referring to FIG. 2, according to an example implementation, a digitizer system or digitizer 200, which may be same as or similar to digitizer 146 of FIG. 1, may be a part of display 144 and may be used with any device 100 (e.g., computing device) to enable interactions between a user and device 100. For example, digitizer system 200 may be part of a user interface operative to detect inputs from one or more pens 290, fingers 204, and/or conductive objects 206.

Digitizer system 200 may include a sensor 212 including a patterned arrangement of conductive lines (sensor lines), which may be optionally transparent, and which are typically overlaid on a display 202. For example, sensor 212 may be a grid-based sensor including horizontal and vertical lines. In some cases, a width of the conductive line may vary over its length, e.g., the width of the conductive line may be narrower around the vicinity of junction points of the grid and wider between the junction points. In some cases, the conductive lines may be shaped like a diamond shape array with diamond points matched to junction points. In some implementations, the parallel conductive lines are equally spaced straight lines, and are input to amplifiers included in application specific integrated circuit (ASIC) 216. For example, the amplifiers may be differential amplifiers.

ASIC 216 includes, for example, circuitry to process and sample an output of the sensor 212 and generate a digital representation. The digital output signal is forwarded to a digital unit 220, e.g., a digital ASIC unit, for further digital processing. For instance, digital unit 220 together with ASIC 216 may serve as a controller of the digitizer system 200 and/or may have the functionality of a controller and/or a processor. In some cases, a single unit may be used, e.g., in a small screen with limited number of lines. In some other additional or optional implementations, ASIC 216 operates as a detection unit for processing and sampling the output of the sensor 212. The outcome, which can be a part of a contact signature, once determined, is forwarded to a host 222, e.g., a computer device or a host computer device, which may be the same as or similar to device 100, via an interface 224 for processing by the operating system or any current application. In one implementation, touch classification may be performed inside a touch controller and the touch controller may communicate, via a communication channel, power mode of device 100 to an arbiter of the power mode. In another implementation, control functionality may be additionally or exclusively included in the host 222, and ASIC 216 and digital unit 220 may be provided as a single ASIC. In some other optional implementations, digital unit 220 and ASICs 216 may be mounted in a PCB 230.

ASIC 216 may be connected to the outputs of the various conductive lines in the grid and functions to process the received signals at a first processing stage. In some cases, instead of a PCB 230 positioned along two sides of sensor 212, a flex cable may be used to connect the conductive lines to ASICs 216, e.g., positioned away from a sensing surface of digitizer 200. As indicated above, ASIC 216 may include one or more arrays of amplifiers, e.g., an array of differential amplifiers, an array of single ended amplifiers, or any array of differential amplifiers, and optionally including one grounded input to amplify the sensor's signals. In some other additional or optional implementations, the grounding input may be selected by ASIC 216. ASIC 216 may optionally include one or more filters to remove irrelevant frequencies. Additionally, filtering is performed prior to sampling. The signal is then sampled by an A/D, optionally filtered by a digital filter and forwarded to digital ASIC unit, for further digital processing. Alternatively, the optional filtering is fully digital or fully analog.

For instance, digital unit 220 receives the sampled data from ASIC 216, reads the sampled data, processes it and determines and/or tracks the position of physical objects, such as pen 290 and/or finger 204, touching the digitizer sensor 212. Further, for example, digital unit 220 is operative to decode information encoded in a transmission signal from pen 290, e.g., pressure on tip, right-click and/or eraser mode, color for tracing, and identification, etc. According to some implementations, hovering of an object, e.g., pen 290, finger 204 and/or hand, may be detected and processed by digital unit 220. In any case, digital unit 220 can send a calculated position to the host 222 via interface 224.

In some implementations, digitizer system or digitizer 200 has several channels, i.e., interfaces included within interface 224, with the host. In an example, interface 224 includes a pen interface for transmitting pen coordinates on the display screen, and a finger touch interface for transmitting finger touch coordinates on the display screen. In some additional examples, a same interface of interface 224 may transmit finger touch coordinates based on both single touch detection method and multi-touch detection method, for example, as described below in reference to FIGS. 4-6. Optionally, the interface 224 may transmit information on detected gestures.

Further, digital unit 220 may be operative to control operation of one or more ASIC(s) 216. For instance, digital unit 220 may be operative to provide a command signal to ASIC 216 to switch between a plurality of available circuit paths (two or more) to connect to outputs of the various conductive lines in the grid. In some cases, digital unit 220 together with ASIC 216 provides for alternately connecting outputs of the various conductors to one of an array of differential amplifiers and an array of single ended amplifiers (or differential amplifiers with one grounded input). In other cases, digital unit 220 may be operative to control triggering of one or more conductive lines. In other examples, ASIC 216 together with digital unit 220 provide for triggering various conductors with an oscillating signal having a selected pre-defined frequency or frequencies.

Digital unit 220 may include at least a memory unit and a processing unit to store and process information obtained from ASIC 216. Memory and processing capability are also generally included in host 222 and ASIC 126. According to some implementations, memory and processing functionality may be divided between any combination of host 222, digital unit 220, and/or ASIC 216.

Figure 3:
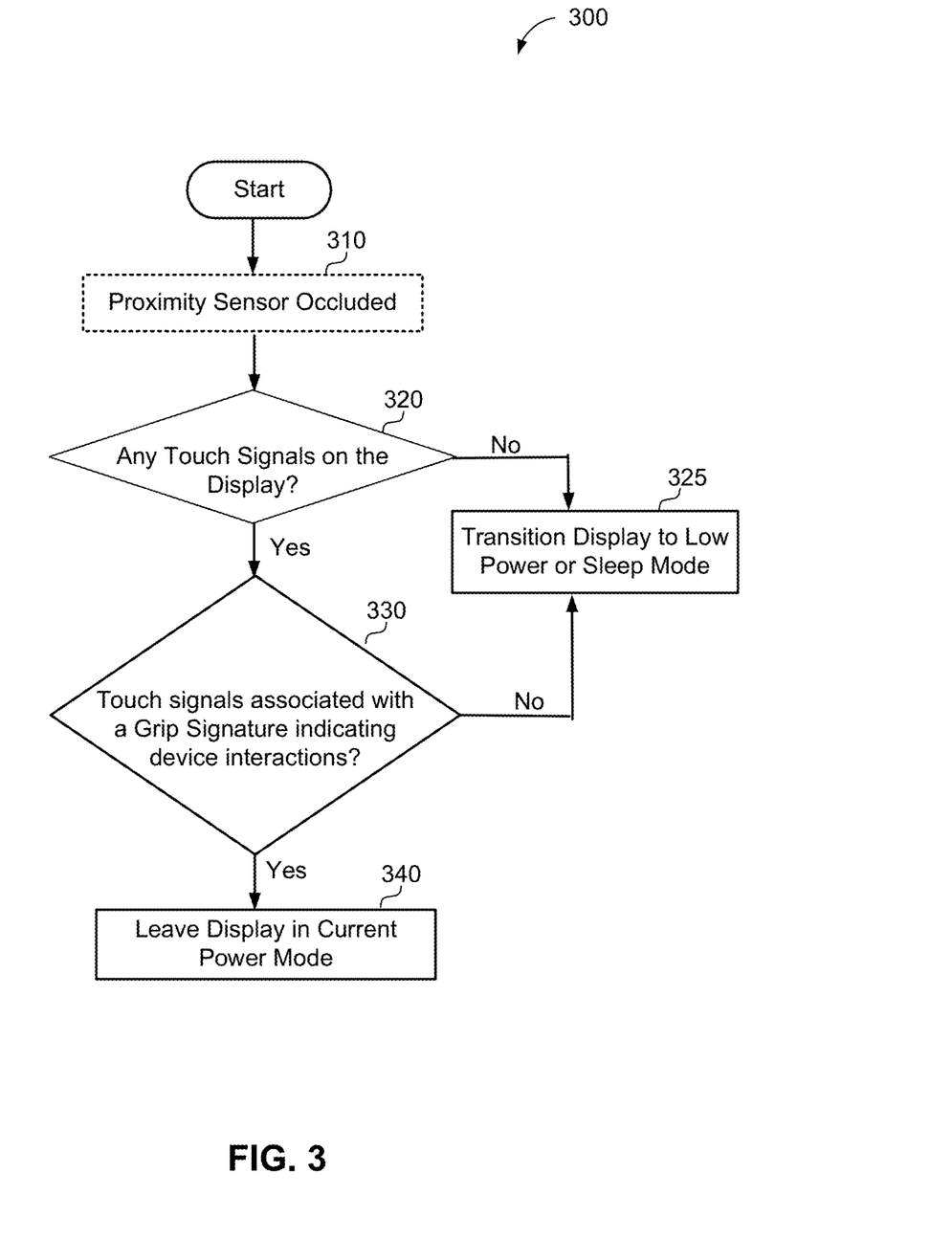
FIG. 3 is a flow diagram of an example method related to adjusting a power mode of a display at a device in accordance with various implementations of the present disclosure.

FIG. 3 is a flow diagram of an example method 300 related to adjusting a power mode of display 144 at device 100 in accordance with various implementations of the present disclosure. Although the operations described below are presented in a particular order and/or as being performed by an example component, it should be understood that the ordering of the actions and the components performing the actions may be varied, depending on the implementation.

At an optional block 310, power mode adjusting component 112 and/or proximity sensor occlusion detecting component 186 detects that proximity sensor 132 is occluded (e.g., blocked, obstructed). As described above in reference to FIG. 1, proximity sensor 132 may be an IR sensor that can detect the presence of nearby objects, and may have been occluded by user's ear/fingers, by device 100 being placed faced down on a table, or by device 100 being in user's pockets, as described in detail in reference to FIGS. 4-6.

Method 300 may proceed to block 320, either initially or, optionally, based on a determination that proximity sensor 132 is occluded. Specifically, at block 320, method 300 may determine whether any touch signals are detected on display 144 of device 100. The touch signals may be detected by digitizer 146 as described above in detail in reference to FIG. 2.

In one option, from block 320, method 300 may proceed to block 330 based on a determination that touch signals are detected at display 144 of device 100. Specifically, at block 330, method 330 may determine whether the touch signals detected by digitizer 146 are associated with a contact signature that may indicate that the user of power mode adjusting component device 100 is engaged with the device 100. For example, as discussed above, power mode adjusting component 112 and/or user engagement determination component 182 may determine whether the user is gripping device 100 around edges of device 100 or holding device 100 with one or two hands in a landscape orientation.

Alternatively, in another option from block 320, method 300 may proceed to block 325 based on a determination that digitizer 146 does not detect any touch signals on display 144 of the device. At block 325, display 144 of device 100 may be transitioned to a lower power mode or sleep mode in response to determining that no touch signals are detected at display 144 of device 100, as described in detail in reference to FIGS. 4-6.

In one option, from block 330, method 300 may proceed to block 340 based on a determination that the touch signals are associated with a contact signature that indicate that the user of device 100 is engaged with device 100. Specifically, at block 340, method 300 may retain (e.g., leave, keep, etc.) display 144 of device 100 in the current power state (e.g., normal power state), as described in detail in reference to FIGS. 4-6. This ensures that display 144 of device 100 is not erroneously idled or transitioned to a low power state when the user is engaged with device 100, which may affect the user's experience.

Figure 4:
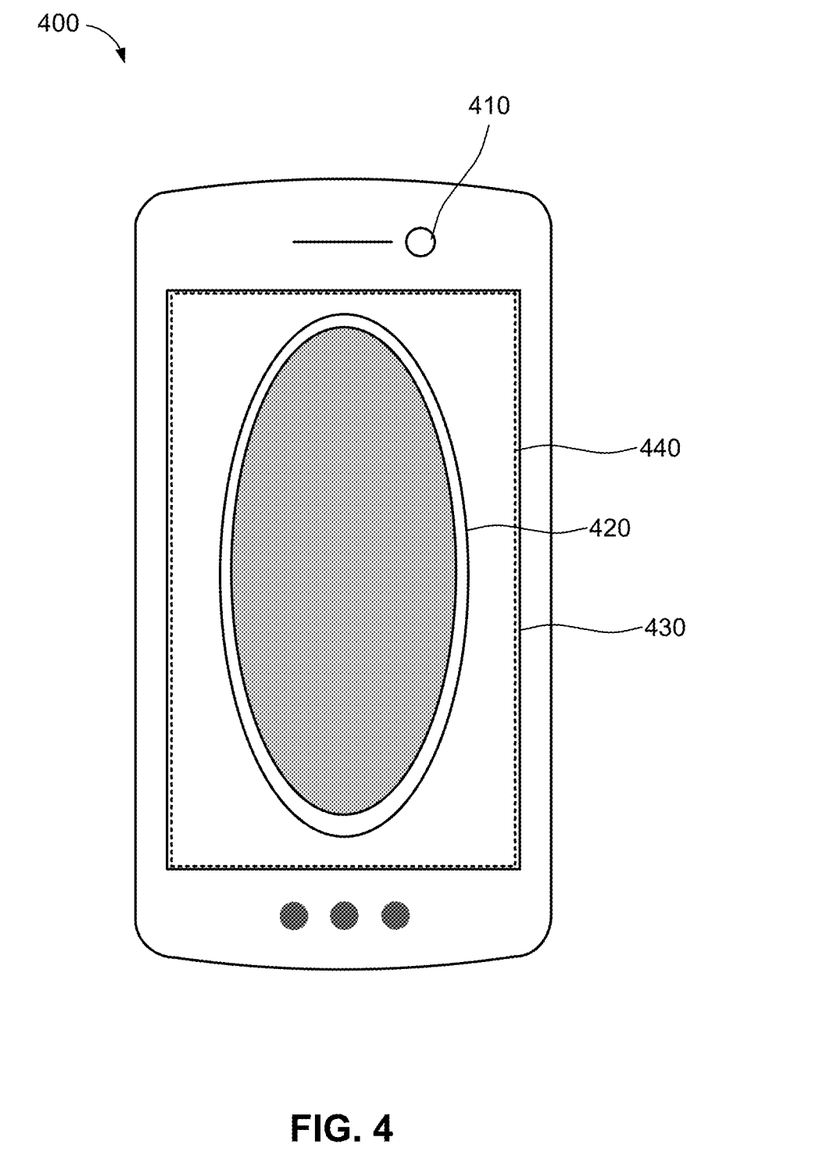
FIGS. 4-6 are front views of a device including example contact signatures which indicate whether the user of the device is engaged with the device in accordance with various implementations of the present disclosure.

Alternatively, in the other option from block 330, method 300 may proceed to block 325 based on a determination that the touch signals are not associated with a contact signature that indicate a user is engaged with device 100, for example, a smudge on a majority portion of the display of device 100 (FIG. 4).

In some implementations, power mode adjusting component 112 may transition the display of the device to the normal power state once the power mode adjusting component 112 determines that the user is engaged with device 100 and/or proximity sensor 132 is not blocked. Thus, according to the present disclosure, power mode adjusting component 112 may adjust a power mode of display 144 at device 100 based on whether the user is engaged with device 100 and/or whether proximity sensor 132 is occluded, which may thereby balance user experience with power savings.

FIG. 4 includes an example contact signature that indicates the user of the device is not engaged with the device in accordance with one implementation of the present disclosure.

For example, device 400, which may be same as or similar to device 100 of FIG. 1, may include a proximity sensor 410 that may or may not be occluded (as indicated by the unfilled circle formed by a solid line), and a digitizer 440 (as indicated by a dotted line) that detects contact on a display 430 (as indicated by a solid line) of device 400 (same as or similar to display 144 of device 100) and produces a contact signature 420, also referred to as a smudge 420. It should be noted that digitizer 440 may not literally display contact signature 420 on display 430. Digitizer 440 may be the same as or similar to digitizer 146 discussed above. For example, contact signature 420 may cover a majority (or other determined percentage or area) of display 430 of device 400 and may be associated with device 400 being placed in a pocket of the user with display 430 facing a leg of the user, or with device 400 being placed faced down on an object (e.g., a table).

Device 400 may determine whether contact signature 420 covers a majority (or other determined percentage or area) of display 430 by comparing the area covered by contact signature 420 with a threshold 126 (e.g., an area or percentage of the area of the display). For example, in an aspect, power mode adjusting component 112 may determine whether contact signature 420 is sufficiently large (or big) enough to be associated with device 400 being placed in the pocket of the user with the display facing the leg of the user, or faced down on an object, by comparing the size of the smudge with threshold 126, such as whether contact signature 420 covers at least 75% of a display area of display 430. It should be understood that threshold 126 may be set to any configurable value. In this example, if contact signature 420 occupies 80% of the display area of display 430, then power mode adjusting component 112 may determine that contact signature 420 does not match or correlate to, or is not associated with, a contact signature that indicates the user is engaged with the device (in other words, contact signature 420 matches, correlates to, or is associated with, a contact signature that indicates the user is not engaged with the device). As such, power mode adjusting component 112 may transition display 430 to a low power mode or idle mode. Alternatively, in another case where contact signature 420 may be smaller, such as when contact signature 420 occupies, for example, 20% of the display area of display 430, power mode adjusting component 112 may determine that contact signature 420 may be associated with a contact signature that indicates the user is engaged with the device. In this scenario, power mode adjusting component 112 may maintain display 430 in a current power mode.

In some implementations, once display 430 of device 400 is transitioned to a low power mode or idle mode, power mode adjusting component 112 may further disable display 430 of device 400 from waking up (e.g., transitioning to the normal power state) to avoid display 430 of device 400 transitioning to the normal power state, e.g., due to accidental pressing of buttons on device 400 when device 400 is located, for example, in the pocket of the user. In this scenario, for instance, the user of device 400 may have to actively provide an input to the 400 to transition to the normal power state.

Figure 5:
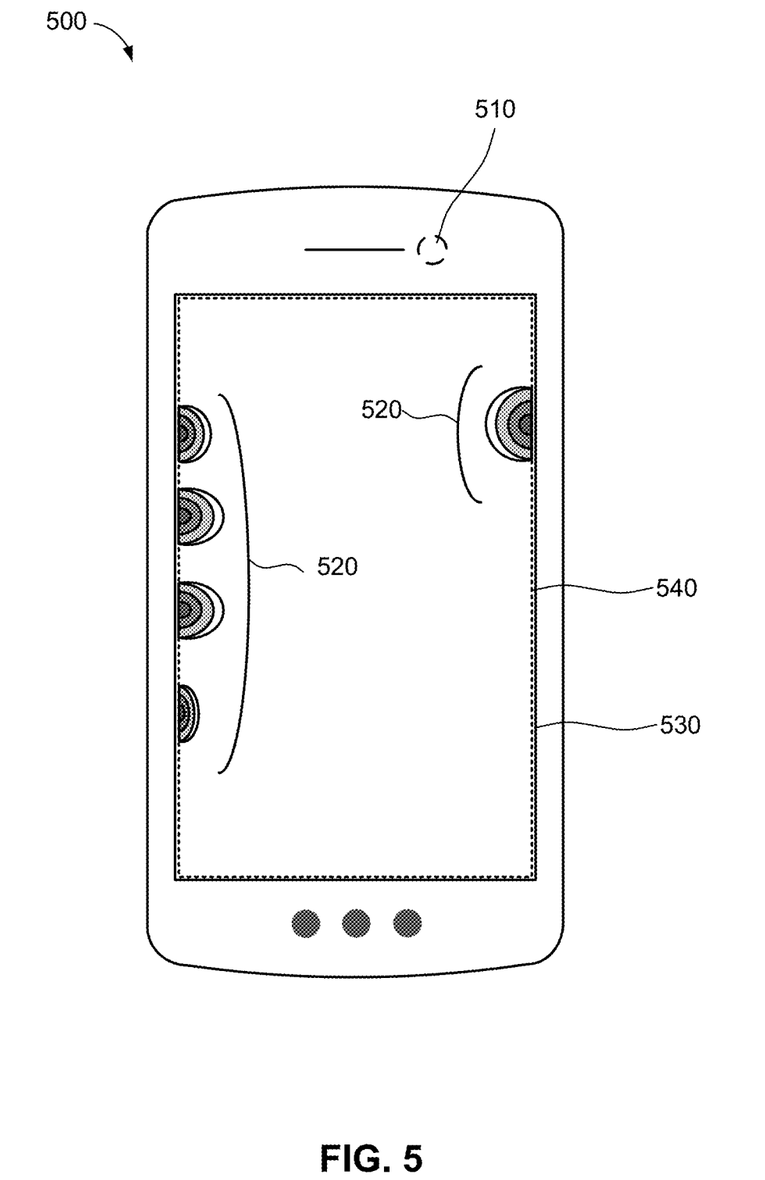

FIG. 5 includes an example contact signature that indicates the user of the device is engaged with the device in accordance with one implementation of the present disclosure.

For example, device 500, which may be same as or similar to device 100 of FIG. 1, may include a proximity sensor 510 that is not occluded (as indicated by the unfilled circle formed by a dashed line), and a digitizer 540 (as indicated by a dotted line) that detects contact on a display 530 (as indicated by a solid line) of device 500 and produces a contact signature 520. It should be noted that digitizer 540 may not literally display contact signature 520 on display 530. Digitizer 540 may be the same as or similar to digitizer 146 discussed above. In this case, contact signature 520 may indicate a user of device 500 gripping device 500 around the edges of display 530 (e.g., along the edges of device 500). Contact signature 520 may be represented by "blooms" along the edges of display 530. For instance, FIG. 5 indicates a user holding device 500 with a right hand of the user, as shown by four touches on the left side of display and one touch on right side of display 530. Based on contact signature 520, power mode adjusting component 112 may determine that contact signature 520 matches, correlates to, or may be associated with a contact signature of the user gripping the device around the edges of device 500, thereby indicating the user is engaged with device 500. In this case, power mode adjusting component 112 may make this determination without proximity sensor 510 being occluded, and may retain the power mode of display 530 in the current power mode. Alternatively, in another case where contact signature 520 fails to match, power mode adjusting component 112 may determine that contact signature 520 may be associated with a contact signature that indicates the user is not engaged with the device. In this scenario, power mode adjusting component 112 may transition display 530 of device 500 to the low power mode or the normal power mode.

Figure 6:
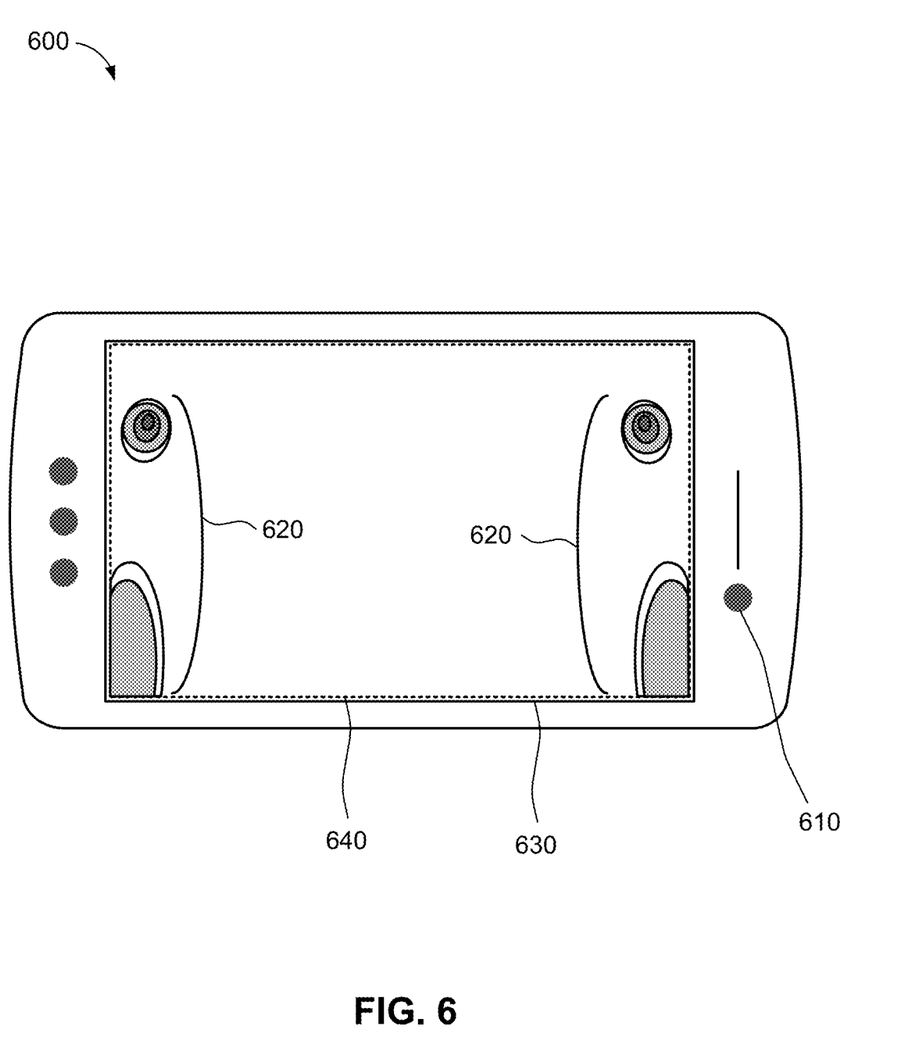

FIG. 6 illustrates an example contact signature that indicates the user of the device is engaged with the device in accordance with one implementation of the present disclosure.

For example, device 600, which may be same as or similar to device 100 of FIG. 1, may include a proximity sensor 610, which may be occluded (as indicated by the filled circle), and a digitizer 640 (as indicated by a dotted line) that detects contact on a display 630 (as indicated by a solid line) of device 600 and produces a contact signature 620. It should be noted that digitizer 640 may not literally display contact signature 620 on display 630. Digitizer 640 may be the same as or similar to digitizer 146 discussed above. In this case, contact signature 620 may indicate the user is holding device 600 with one or two hands in a landscape orientation as indicated by the user's palms and/or thumbs in contact signature 620. In response, power mode adjusting component 112 may determine that contact signature 620 matches, correlates to, or may be associated with a contact signature of the user holding device 600 with one or two hands in a landscape orientation, and indicating the user of device 600 is engaged with device 600 with proximity sensor 610 occluded. As such, power mode adjusting component 112 may retain the power mode of display 630 in the current power mode. Alternatively, in another case where contact signature 620 fails to match, power mode adjusting component 112 may determine that contact signature 620 may be associated with a contact signature that indicates the user is not engaged with the device. In this scenario, power mode adjusting component 112 may transition display 630 of device 600 to the low power mode or the normal power mode.

Figure 7:
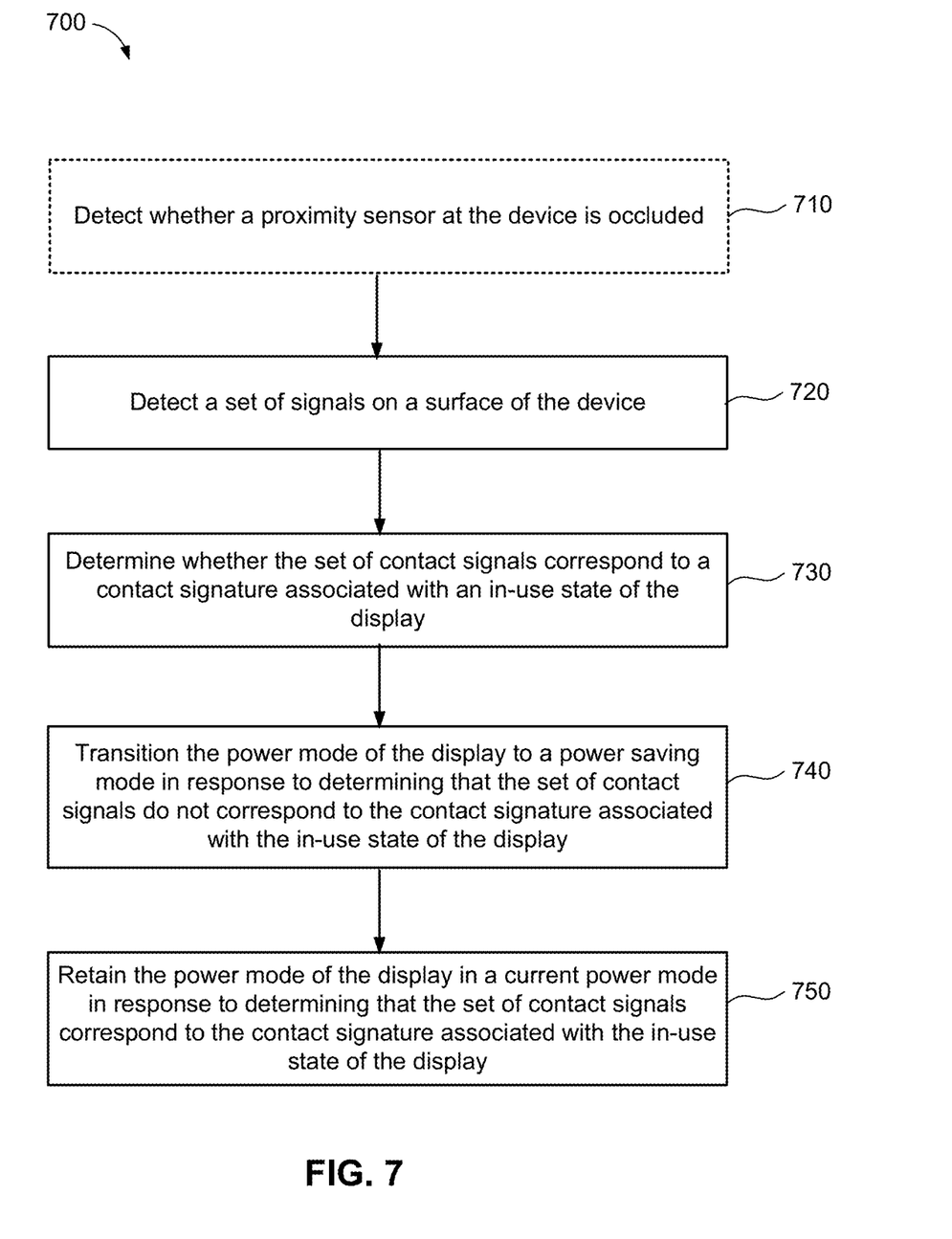
FIG. 7 is a flowchart of an example method of adjusting a power mode of a display at a device in accordance with various implementations of the present disclosure.

FIG. 7 includes an example of a method 700 performed by power mode adjusting component 112 of device 100 for adjusting a power mode of display 144 at device 100.

For example, at block 710, method 700 may optionally include detecting whether a proximity sensor at the device is occluded. For example, power mode adjusting component 112 may detect whether proximity sensor 132 is occluded. In some implementations, the status (e.g., blocked/unblocked) of proximity sensor 132 may be used, in addition to the contact signatures, to determine whether to transition device 100 to a low power/idle mode or retain the power mode of display 144 in the current power mode.

For example, at block 720, method 700 may include detecting a set of signals on a surface of the device. For example, power mode adjusting component 112 may detect a set of contact signals (e.g., one or more signals) on a surface (e.g., display or edges of device 100).

For example, at block 730, method 700 may include determining whether the set of contact signals correspond to a contact signature associated with an in-use state of the display. For example, power mode adjusting component 112 may determine whether the set of contact signals correspond to a contact signature, for example, described in detail in reference to FIGS. 4-6, associated with an in-use state of display 144.

For example, the contact signature may be a first contact signature associated with the user gripping device 100 around the edges of device 100 indicating the user is engaged with device 100 (e.g., contact signature 520 of FIG. 5), a second contact signature associated with the user holding device 100 with one or two hands in a landscape orientation, indicating the user of device 100 is engaged with device 100 (e.g., contact signature 620 of FIG. 6), and a third contact signature associated with a contact covering a majority of display 144 indicating the user of device 100 is not engaged with the device (e.g., contact signature 420 of FIG. 4). It should be noted that other contact signatures may be utilized, including contact signatures that indicate the user is not engaged with device 100 as well as contact signatures that indicate the user is engaged with device 100. Further, for example, power mode adjusting component 112 may receive current contact signatures based on contacts detected by digitizer 146, compare contact signatures with known contact signatures, and identify if there is a match.

At block 740, method 700 includes transitioning the power mode of the display to a power saving mode in response to determining that the set of contact signals do not correspond to the contact signature associated with the in-use state of the display.

At block 750, method 700 includes retaining the power mode of the display in a current power mode in response to determining that the set of contact signals correspond to the contact signature associated with the in-use state of the display.

In some implementations, power mode adjusting component 112 and/or power mode transition component 184 may retain the power mode of the display in the current power mode (e.g., standard or normal power mode) in response to determining that the contact signature is the first contact signature associated with the user gripping the device around edges of the device, and with or without the proximity sensor being occluded. For example, proximity sensor 132 may have been occluded by the user's other hand.

Further, in some implementations, power mode adjusting component 112 and/or power mode transition component 184 may retain the power mode of the display in the current power mode in response to determining that the contact signature is a second contact signature associated with the user holding the device with one or two hands in the landscape view indicating the user of the device is engaged with the device and with the proximity sensor occluded.

Furthermore, in some implementations, power mode adjusting component 112 and/or power mode transition component 184 may transition the power mode of the display to a low power mode or an idle mode in response to determining that the contact signature is a third contact signature associated with smudge covering a majority of the display (e.g., 420 of FIG. 4) indicating the user of the device is not engaged with the device and with the proximity sensor occluded.

The implementations described above also provide for transitioning display 144 to a low power mode or an idle mode when display 144 (or a touch panel of display 144) is covered by a non-capacitive object (e.g., a table) based on the occlusion of proximity sensor 132 and absence of any grip or touch signatures on display 144 of device 100.

Thus, the power mode of display 144 at device 100 may be adjusted to save power and/or avoid erroneously idling display 144 at device 100. The implementations described above achieve a balance between power savings and user experience.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with implementations disclosed herein.

What is claimed is:

1. A method of adjusting a power mode of a display of a device, comprising:
   detecting a set of contact signals on a touch surface of the device;
   determining whether the set of contact signals correspond to a contact signature associated with an in-use state of the display based on one or more of a signal strength or a duration corresponding to the set of contact signals and based on a percentage of an area of the touch surface of the display being covered by the set of contact signals, wherein the contact signature corresponds to one or more mappings of areas of contact of an object with the touch surface of the display;
   transitioning the power mode of the display to a power saving mode in response to determining that the set of contact signals do not correspond to the contact signature associated with the in-use state of the display; and
   retaining the power mode of the display in a current power mode in response to determining that the set of contact signals correspond to the contact signature associated with the in-use state of the display.

2. The method of claim 1, further comprising:
   detecting whether a proximity sensor at the device is occluded, and
   wherein transitioning the power mode of the display to the power saving mode and retaining the power mode of the display in the current power mode are further based on whether the proximity sensor is occluded.

3. The method of claim 2, wherein the contact signature is associated with the device being held around edges of the device indicating the in-use state of the display, wherein the detecting includes detecting the proximity sensor is not occluded, and retaining the power mode of the display in the current power mode in response to determining that the set of contact signals correspond to the contact signature associated with the in-use state of the display and detecting that the proximity sensor is not occluded.

4. The method of claim 2, wherein the contact signature is associated with the device being held with one or two hands in a landscape orientation indicating the in-use state of the display, wherein the detecting includes detecting the proximity sensor is occluded, and retaining the power mode of the display in the current power mode in response to determining that the set of contact signals correspond to the contact signature associated with the in-use state of the display and detecting that the proximity sensor is occluded.

5. The method of claim 2, wherein the contact signature is associated with the display of the device being covered which does not indicate the in-use state of the display, wherein the detecting includes detecting the proximity sensor is occluded, and transitioning the power mode of the display to the power saving mode in response to determining that the set of contact signals do not correspond to the contact signature associated with the in-use state of the display.

6. The method of claim 5, further comprising:
   comparing a size of the set of contact signals on the touch surface of the device with a threshold; and
   determining whether the set of contact signals correspond to the contact signature associated with in-use state of the display based on the comparison.

7. The method of claim 5, further comprising:
   disabling the display of the device in response to detecting a button being pressed on the device after transitioning the device to the power saving mode.

8. An apparatus for adjusting a power mode of a display of a device, comprising:
   a memory; and
   a processor in communication with the memory, wherein the processor is configured to:
     detect a set of contact signals on a touch surface of the device;
     determine whether the set of contact signals correspond to a contact signature associated with an in-use state of the display based on one or more of a signal strength or a duration corresponding to the set of contact signals and based on a percentage of an area of the touch surface of the display being covered by the set of contact signals, wherein the contact signature corresponds to one or more mappings of areas of contact of an object with the touch surface of the display;
     transition the power mode of the display to a power saving mode in response to determining that the set of contact signals do not correspond to the contact signature associated with the in-use state of the display; and
     retain the power mode of the display in a current power mode in response to determining that the set of contact signals correspond to the contact signature associated with the in-use state of the display.

9. The apparatus of claim 8, wherein the processor is further configured to:
   detect whether a proximity sensor at the device is occluded, and
   wherein transition the power mode of the display to the power saving mode and retain the power mode of the display in the current power mode are further based on whether the proximity sensor is occluded.

10. The apparatus of claim 9, wherein the contact signature is associated with the device being held around edges of the device indicating the in-use state of the display, wherein the proximity sensor is not occluded, and wherein the processor is further configured to retain the power mode of the display in the current power mode in response to determining that the set of contact signals correspond to the contact signature associated with the in-use state of the display and that the proximity sensor is not occluded.

11. The apparatus of claim 9, wherein the contact signature is associated with the device being held with one or two hands in a landscape orientation indicating the in-use state of the display, wherein the proximity sensor is occluded, and wherein the processor is further configured to retain the power mode of the display in the current power mode in response to determining that the set of contact signals correspond to the contact signature associated with the in-use state of the display and that the proximity sensor is occluded.

12. The apparatus of claim 9, wherein the contact signature is associated with the display of the device being covered which does not indicate the in-use state of the display, wherein the proximity sensor is occluded, and wherein the processor is further configured to transition the power mode of the display to the power saving mode in response to determining that the set of contact signals do not correspond to the contact signature associated with the in-use state of the display.

13. The apparatus of claim 12, wherein the processor is further configured to:
compare a size of the set of contact signals on the touch surface of the device with a threshold; and
determine whether the set of contact signals correspond to the contact signature associated with in-use state of the display based on the comparison.

14. The apparatus of claim 12, wherein the processor is further configured to:
disable the display of the device in response to detecting a button being pressed on the device after transitioning the device to the power saving mode.

15. A non-transitory computer-readable storage medium storing computer-executable instructions executable by a processor for adjusting a power mode of a display of a device, comprising:
instructions for determining detecting a set of contact signals on a touch surface of the device;
instructions for determining whether the set of contact signals correspond to a contact signature associated with an in-use state of the display based on one or more of a signal strength or a duration corresponding to the set of contact signals and based on a percentage of an area of the touch surface of the display being covered by the set of contact signals, wherein the contact signature corresponds to one or more mappings of areas of contact of an object with the touch surface of the display;
instructions for transitioning the power mode of the display to a power saving mode in response to determining that the set of contact signals do not correspond to the contact signature associated with the in-use state of the display; and
instructions for retaining the power mode of the display in a current power mode in response to determining that the set of contact signals correspond to the contact signature associated with the in-use state of the display.

16. The non-transitory computer-readable storage medium of claim 15, further comprising:
instructions for detecting whether a proximity sensor at the device is occluded, and
wherein transitioning the power mode of the display to the power saving mode and retaining the power mode of the display in the current power mode are further based on whether the proximity sensor is occluded.

17. The non-transitory computer-readable storage medium of claim 16, wherein the contact signature is associated with the device being held around edges of the device indicating the in-use state of the display, wherein the proximity sensor is not occluded, and further comprising instructions for retaining the power mode of the display in the current power mode in response to determining that the set of contact signals correspond to the contact signature associated with the in-use state of the display and that the proximity sensor is not occluded.

18. The non-transitory computer-readable storage medium of claim 16, wherein the contact signature is associated with the device being held with one or two hands in a landscape orientation indicating the in-use state of the display, wherein the proximity sensor is occluded, and further comprising instructions for retaining the power mode of the display in the current power mode in response to determining that the set of contact signals correspond to the contact signature associated with the in-use state of the display and that the proximity sensor is occluded.

19. The non-transitory computer-readable storage medium of claim 16, wherein the contact signature is associated with the display of the device being covered which does not indicate the in-use state of the display, wherein the proximity sensor is occluded, and further comprising instructions for transitioning the power mode of the display to the power saving mode in response to determining that the set of contact signals do not correspond to the contact signature associated with the in-use state of the display.

20. The non-transitory computer-readable storage medium of claim 19, further comprising:
instructions for comparing a size of the set of contact signals on the touch surface of the device with a threshold; and
instructions for determining whether the set of contact signals correspond to the contact signature associated with in-use state of the display based on the comparison.

* * * * *